(12) United States Patent
Cheng

(10) Patent No.: US 8,891,755 B2
(45) Date of Patent: Nov. 18, 2014

(54) TELEPHONE SET AND METHOD OF CONTROLLING OFF-HOOK/ON-HOOK STATE OF THE TELEPHONE SET

(71) Applicant: Huawei Technologies Co., Ltd., Guangdong (CN)

(72) Inventor: Qiaoqiao Cheng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/138,517

(22) Filed: Dec. 23, 2013

(65) Prior Publication Data

US 2014/0105380 A1    Apr. 17, 2014

Related U.S. Application Data

(63) Continuation of application No. PCT/CN2013/073398, filed on Mar. 29, 2013.

(30) Foreign Application Priority Data

Sep. 4, 2012    (CN) .......................... 2012 1 0323637

(51) Int. Cl.
*H04M 1/00* (2006.01)
*H04M 9/00* (2006.01)
*H04M 1/06* (2006.01)
*H04M 1/10* (2006.01)
*H04M 1/08* (2006.01)

(52) U.S. Cl.
CPC ......... *H04M 1/06* (2013.01); *H04M 1/10* (2013.01); *H04M 1/08* (2013.01)
USPC ............................ 379/422; 379/423; 379/424

(58) Field of Classification Search
USPC ................................................. 379/422–424
See application file for complete search history.

(56) References Cited

U.S. PATENT DOCUMENTS

| 5,867,573 | A | * | 2/1999 | Wittman | .................. 379/388.07 |
| 6,049,701 | A | * | 4/2000 | Sparksman | .................. 455/74.1 |
| 6,483,916 | B1 | | 11/2002 | Hu | |
| 2002/0004410 | A1 | * | 1/2002 | Schulze | ........................ 455/550 |

FOREIGN PATENT DOCUMENTS

| CN | 2502464 | Y | 7/2002 |
| CN | 2523147 | Y | 11/2002 |
| CN | 201204626 | Y | 3/2009 |
| EP | 0329399 | A2 | 8/1989 |
| EP | 0789472 | A2 | 8/1997 |
| EP | 0930762 | A1 | 7/1999 |

* cited by examiner

*Primary Examiner* — Alexander Jamal
(74) *Attorney, Agent, or Firm* — Leydig, Voit & Mayer, Ltd.

(57) ABSTRACT

The present disclosure discloses a telephone set and a method of controlling off-hook/on-hook state of a telephone set, and belongs to the field of communications devices. The telephone set includes a handle and a host, where the handle includes a first switch, and the host includes a second switch. According to the present disclosure, the first switch is added on the handle of the telephone set, the second switch is correspondingly added into the host of the telephone set, and a state of the first switch is used to control the second switch to send an off-hook/on-hook signal, so as to enable the telephone set to be off-hook/on-hook.

5 Claims, 4 Drawing Sheets

TELEPHONE SET AND METHOD OF CONTROLLING OFF-HOOK/ON-HOOK STATE OF THE TELEPHONE SET

CROSS-REFERENCE TO RELATED APPLICATION

This application is a continuation of International Patent Application No. PCT/CN 2013/073398, filed on Mar. 29, 2013, which claims priority to Chinese Patent Application No. 201210323637.5, filed on Sep. 4, 2012, both of which are hereby incorporated by reference in their entireties.

TECHNICAL FIELD

The present disclosure relates to the field of communications devices, and in particular, to telephone sets and methods of controlling off-hook/on-hook state of a telephone set.

BACKGROUND

In the existing design of a telephone, for the off-hook/on-hook design of a handle, an off-hook/on-hook detection apparatus, such as a hook switch, magnetic induction, or optical sensing, is generally disposed on a cradle of a fixed-line phone. When the handle is placed on a corresponding position of the cradle of the fixed-line phone, the off-hook/on-hook detection apparatus detects a placement state of the handle, and then transfers the state to a telephone of the fixed-line phone for indicating an off-hook/on-hook state of the handle.

In a conventional design, for a fixed-line phone where a cradle is integrated with a telephone, an off-hook/on-hook detection apparatus is designed on the cradle of the fixed-line phone, and if it needs to implement off-hook/on-hook, a handle placed at a fixed position on the cradle must be picked up or the handle must be placed on the cradle, which limits the use and a placement range of the handle and causes a use limit to a user.

For a fixed-line phone where a cradle is separated from a telephone, an additional cable is required to connect the cradle and the telephone, and the cable transmits an off-hook/on-hook signal, which not only increases the space occupied by the fixed-line phone but also increases a design cost, and for a user, increases the complexity of desktop layout.

SUMMARY

In order to solve the problem in the prior art, embodiments of the present disclosure provide telephone sets and methods of controlling off-hook/on-hook state of a telephone set. The technical solutions are described as follows:

In one aspect, a telephone set is provided, where the telephone set includes a handle and a host, where the handle is connected to the host through a signal transmission line, the handle includes a microphone, a telephone receiver, and a first signal transceiver, where the telephone receiver is electrically connected to the first signal transceiver, and the microphone is electrically connected to the first signal transceiver, and the host includes a processor and a second signal transceiver, where the processor is electrically connected to the second signal transceiver;

the handle further includes a first switch, where a connection state of the first switch controls an electrical connection state between the microphone and the first signal transceiver; and the host further includes a second switch, where the second switch learns the electrical connection state between the microphone and the first signal transceiver by detecting an electrical signal received, through the signal transmission line, by the second signal transceiver, and sends an off-hook/on-hook signal to the processor according to the electrical connection state between the microphone and the first signal transceiver, so as to enable the telephone set to be off-hook/on-hook, e.g., in an on-hook state or an off-hook state.

The microphone is electrically connected to the first signal transceiver through a first data transmission line and a second data transmission line, where the first data transmission line and the second data transmission line are a positive transmission line and a negative transmission line of a differential circuit in the microphone, respectively, and two interfaces of the first switch are connected to the first data transmission line and second data transmission line, respectively; and correspondingly, controlling, by a connection state of the first switch, an electrical connection state between the microphone and the first signal transceiver includes: when the first switch is in a short-circuited state, the first data transmission line and the second data transmission line being short-circuited, and the electrical connection state between the microphone and the first signal transceiver being disconnected; when the first switch is in a disconnected state, the first data transmission line and the second data transmission line being not short-circuited, and an electrical connection between the microphone and the first signal transceiver being kept.

A voice input end of the processor is electrically connected to a voice input end of the second signal transceiver through a third data transmission line and a fourth data transmission line, where the third data transmission line and the fourth data transmission line are a positive transmission line and a negative transmission line of a differential circuit in the second signal transceiver, respectively, and the second switch includes three interfaces, where a first interface is connected to the third data transmission line, a second interface is connected to the fourth data transmission line, and a third interface is connected to the processor; and correspondingly, learning, by the second switch, the electrical connection state between the microphone and the first signal transceiver by detecting an electrical signal received, through the signal transmission line, by the second signal transceiver, and sending an off-hook/on-hook signal to the processor according to the electrical connection state between the microphone and the first signal transceiver, so as to enable the telephone set to be off-hook/on-hook include:

when the first switch is in a short-circuited state, the first data transmission line and the second data transmission line being short-circuited, and the electrical connection state between the microphone and the first signal transceiver being disconnected, and when the first interface and the second interface of the second switch each detect the electrical signal received, through the signal transmission line, by the second signal transceiver, and determine that voltages of the third data transmission line and the fourth data transmission line are equal, the second switch being short-circuited, and a low level signal being sent to the processor through the third interface, so as to enable the telephone set to be on-hook; or when the first switch is in a disconnected state, the first data transmission line and the second data transmission line being disconnected, and an electrical connection between the microphone and the first signal transceiver being kept, and when the first interface and the second interface of the second switch each detect the electrical signal received, through the signal transmission line, by the second signal transceiver, and determine that voltages of the third data transmission line and the fourth data transmission line are not equal, the second switch keeping disconnected, and a high level signal being sent to the processor through the third interface, so as to enable the telephone set to be off-hook.

The telephone set further includes a cradle used in coordination with the handle, where a bulge is disposed on the cradle, and when the handle is placed on the cradle, the bulge contacts the first switch, so that the first switch is in the short-circuited state; when the handle is not placed on the cradle, the first switch is in the disconnected state.

The bulge is an on-hook press point or a magnetic control switch.

The first switch is a physical switch or a circuit module configured to implement a switch function, and the second switch is a metal oxide semiconductor MOS, a comparison circuit having a voltage comparison function, or a circuit component having a voltage comparison function.

In another aspect, a method of controlling off-hook/on-hook state of a telephone set is provided, where the telephone set includes a handle and a host, where the handle is connected to the host through a signal transmission line, including:

receiving, by the host, an electrical signal transferred through the signal transmission line;

detecting an electrical connection state between a microphone and a first signal transceiver in the handle through the electrical signal; and triggering an off-hook/on-hook signal according to the electrical connection state between the microphone and the first signal transceiver in the handle, so as to enable the telephone set to be off-hook/on-hook.

Triggering an off-hook/on-hook signal according to the electrical connection state between the microphone and the first signal transceiver in the handle, so as to enable the telephone set to be off-hook/on-hook, includes:

when it is detected that the electrical connection state between the microphone and the first signal transceiver is disconnected, sending a low level signal to a processor in the host, so as to enable the telephone set to be on-hook; or when it is detected that the electrical connection state between the microphone and the first signal transceiver is that an electrical connection is kept, sending a high level signal to a processor in the host, so as to enable the telephone set to be off-hook.

Beneficial effects of the technical solutions provided by the embodiments of the present disclosure are described as follows:

The first switch is added on the handle of the telephone set, the second switch is correspondingly added into the host of the telephone set, and the state of the first switch is used to control the second switch to send the off-hook/on-hook signal, so as to enable the telephone set to be off-hook/on-hook. Compared with a conventional fixed-line phone, the use of the handle is not limited by a position of the cradle, and even the cradle is not needed. In addition, because an off-hook/on-hook detection function is implemented by the first switch in combination with the second switch, the space occupied by the fixed-line phone is decreased, and desktop layout is simplified.

BRIEF DESCRIPTION OF DRAWINGS

To illustrate the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure more comprehensible, the following further describes the embodiments of the present disclosure in detail with reference to the accompanying drawings.

Figure 1A:
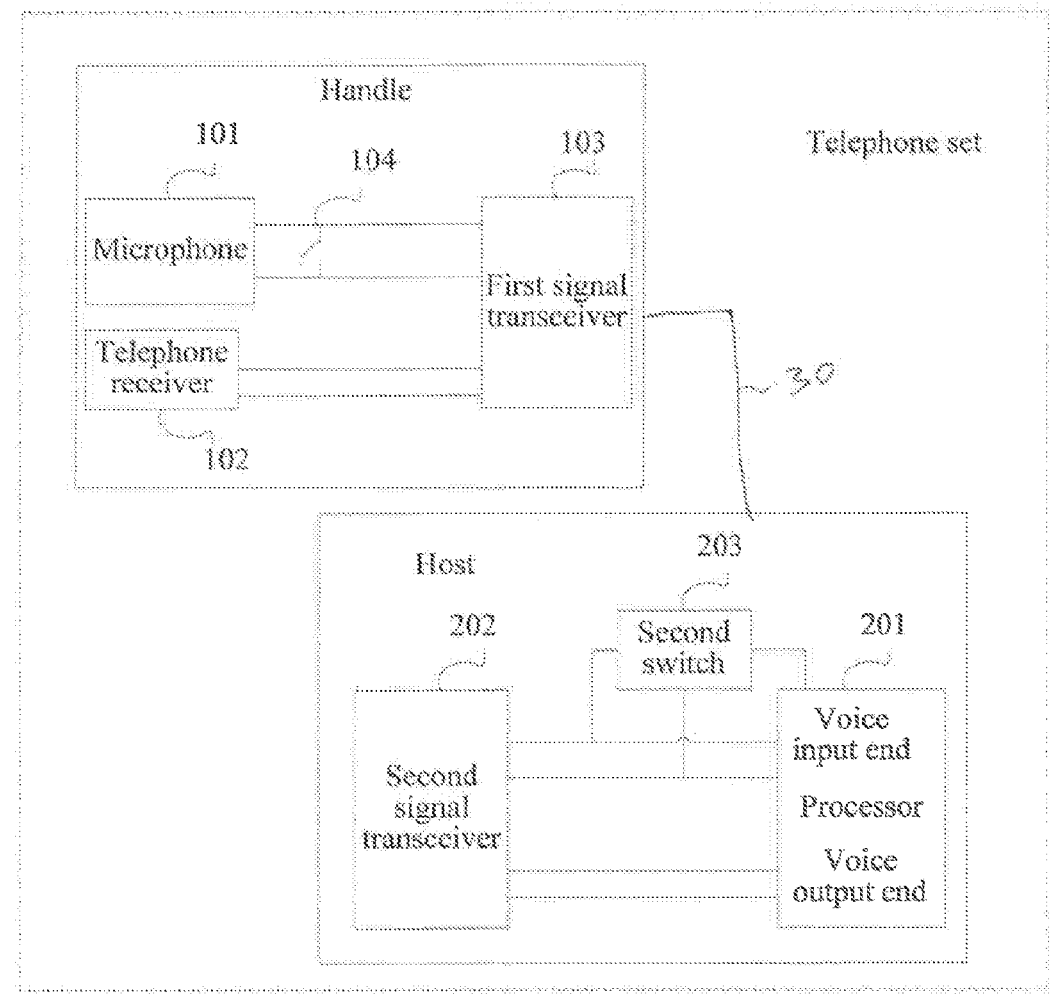
FIG. 1a is a schematic structural diagram of a telephone set according to an embodiment.

FIG. 1a is a schematic structural diagram of a telephone set according to an embodiment. Referring to FIG. 1a, the telephone set includes a handle 10 and a host 20, where the handle 10 is connected to the host 20 through a signal transmission line 30, the handle 10 includes a microphone 101, a telephone receiver 102, and a first signal transceiver 103, where the telephone receiver 102 is electrically connected to the first signal transceiver 103, and the microphone 101 is electrically connected to the first signal transceiver 103, and the host 20 includes a processor 201 and a second signal transceiver 202, where the processor 201 is electrically connected to the second signal transceiver 202.

The handle 10 further includes a first switch 104, where a connection state of the first switch 104 controls an electrical connection state between the microphone 101 and the first signal transceiver 103.

The host 20 further includes a second switch 203, where the second switch 203 learns the electrical connection state between the microphone 101 and the first signal transceiver 103 by detecting an electrical signal received, through the signal transmission line 30, by the second signal transceiver 202, and sends an off-hook/on-hook signal to the processor 201 according to the electrical connection state between the microphone 101 and the first signal transceiver 103, so as to enable the telephone set to be off-hook/on-hook.

According to the telephone set provided in this embodiment, the first switch is added on the handle of the telephone set, the second switch is correspondingly added into the host of the telephone set, and the state of the first switch is used to control the second switch to send the off-hook/on-hook signal, so as to enable the telephone set to be off-hook/on-hook. Compared with a conventional fixed-line phone, the use of the handle is not limited by a position of a cradle, and even the cradle is not needed. In addition, because an off-hook/on-hook detection function is implemented by the first switch in combination with the second switch, the space occupied by the fixed-line phone is decreased, and desktop layout is simplified.

Figure 1B:
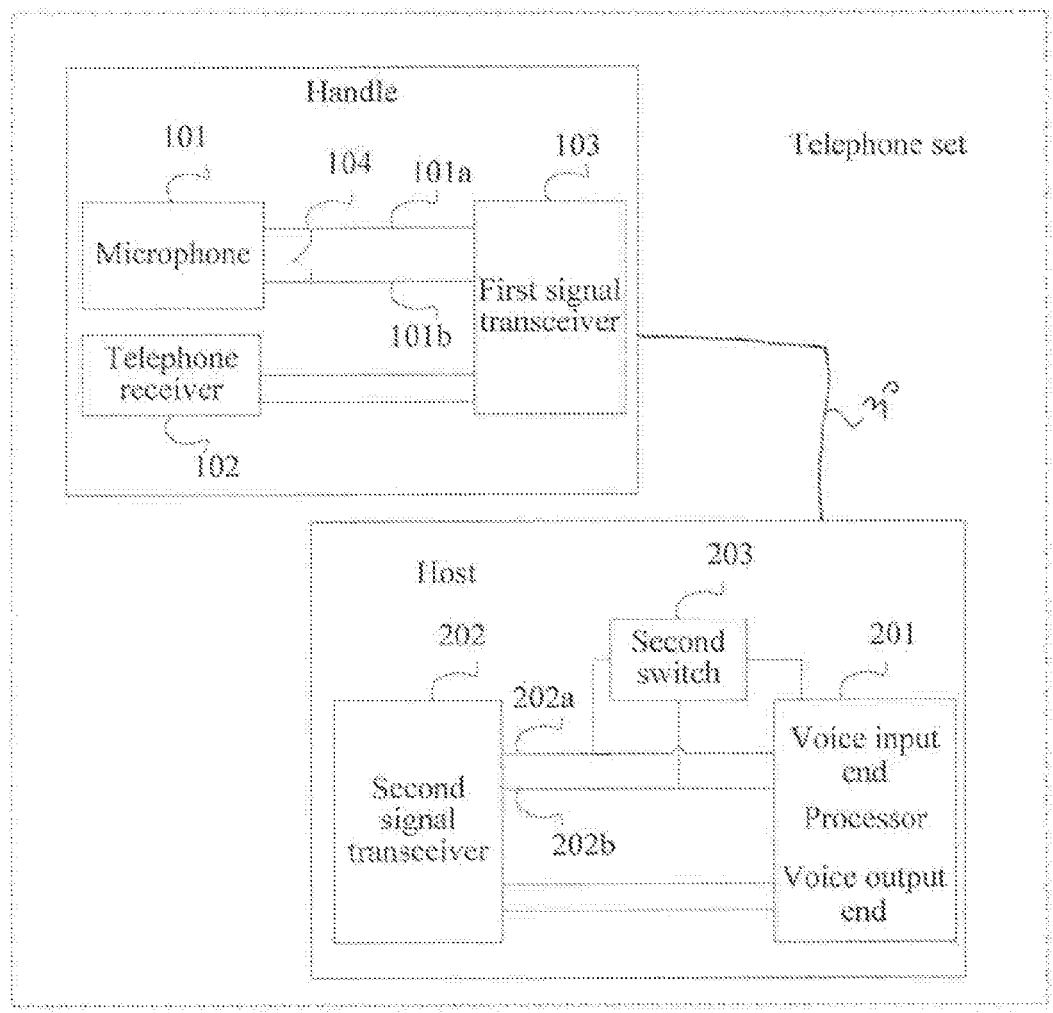
FIG. 1b is a schematic structural diagram of a telephone set according to an embodiment.

FIG. 1b is a schematic structural diagram of a telephone set according to an embodiment. Based on the embodiment shown in FIG. 1a, an internal structure of the telephone set is further described in this embodiment. The microphone 101 is electrically connected to the first signal transceiver 103 through a first data transmission line 101a and a second data transmission line 101b, where the first data transmission line 101a and the second data transmission line 101b are a positive transmission line and a negative transmission line of a differential circuit (not shown in the figure) in the microphone 101, respectively, and two interfaces of the first switch 104 are connected to the first data transmission line 101a and the second data transmission line 101b, respectively. Correspondingly, controlling, by a connection state of the first switch 104, an electrical connection state between the microphone 101 and the first signal transceiver 103 includes: when the first switch 104 is in a short-circuited state, the first data transmission line 101a and the second data transmission line 101b being short-circuited, and the electrical connection state between the microphone 101 and the first signal transceiver 103 being disconnected; when the first switch 104 is in a disconnected state, the first data transmission line 101a and the second data transmission line 101b being not short-circuited, and an electrical connection between the microphone 101 and the first signal transceiver 103 being kept.

In this embodiment, a wired connection exists between the handle 10 and the host 20, that is, a voice signal is transmitted between the handle 10 and the host 20 through an RJ9 connection line of the handle. Specifically, a differential voice signal (transmitted through the first data transmission line 101a and the second data transmission line 101b) sent by the microphone 101 is transmitted to a second signal transceiver 202 (an RJ port) of the host through the RJ9 connection line, and then transmitted to the processor 201 of the host 20 for voice processing. For a voice sent from the other communicator to the local, the processor 201 directly sends the voice to the second signal transceiver 202, and the voice is transferred to the telephone receiver 102 in the handle 10 through the RJ9 connection line for voice sounding. This channel is not changed in the present disclosure, and a conventional connection manner is kept.

Optionally, based on the embodiment shown in FIG. 1b, it should be noted that, for the first switch 104, the short-circuited state and the disconnected state of the first switch 104 both directly affect a state between the first data transmission line 101a and the second data transmission line 101b. When the first switch 104 is in the short-circuited state, the first data transmission line 101a and the second data transmission line 101b are short-circuited; therefore, voltages of the first data transmission line 101a and the second data transmission line 101b are equal, which are equal to 0, and the electrical connection between the microphone 101 and the first signal transceiver 103 is disconnected. When the first switch 104 is in the disconnected state, the first data transmission line 101a and the second data transmission line 101b are not short-circuited, and because the first data transmission line 101a the second data transmission line 101b are the positive transmission line and the negative transmission line of the differential circuit, respectively, voltages of the first data transmission line 101a and the second data transmission line 101b are not equal, so that the electrical connection between microphone 101 and the first signal transceiver 103 is kept.

Optionally, based on the embodiment shown in FIG. 1a, a voice input end of the processor 201 is electrically connected to a voice input end of the second signal transceiver 202 through a third data transmission line 202a and a fourth data transmission line 202b, where the third data transmission line 202a and the fourth data transmission line 202b are a positive transmission line and a negative transmission line of a differential circuit (not shown in the figure) in the second signal transceiver 202, respectively, and the second switch 203 includes three interfaces, where a first interface is connected to the third data transmission line 202a, a second interface is connected to the fourth data transmission line 202b, and a third interface is connected to the processor 201.

Correspondingly, learning, by the second switch 203, the electrical connection state between the microphone 101 and the first signal transceiver 103 by detecting an electrical signal received, through the signal transmission line 30, by the second signal transceiver 202, and sending an off-hook/on-hook signal to the processor 201 according to the electrical connection state between the microphone 101 and the first signal transceiver 103, so as to enable the telephone set to be off-hook/on-hook, include the following (1) and (2):

(1) When the first switch 104 is in the short-circuited state, the first data transmission line 101a and the second data transmission line 101b are short-circuited, and the electrical connection state between the microphone 101 and the first signal transceiver 103 is disconnected, and when the first interface and the second interface of the second switch 203 each detect the electrical signal received, through the signal transmission line, by the second signal transceiver 202, and determine that the voltages of the third data transmission line 202a and the fourth data transmission line 202b are equal, the second switch 203 is short-circuited, and a low level signal is sent to the processor 201 through the third interface, so as to enable the telephone set to be on-hook.

When the first switch 104 is in the short-circuited state, the first data transmission line 101a and the second data transmission line 101b are short-circuited, so that the electrical connection state between the microphone 101 and the first signal transceiver 103 is disconnected. At this time, the voltages of the third data transmission line 202a and the fourth data transmission line 202b that are connected to the voice input end of the second signal transceiver 202 are 0, that is, the voltages of the third data transmission line 202a and the fourth data transmission line 202b are equal. The first interface is connected to the third data transmission line 202a, and the second interface is connected to the fourth data transmission line 202b; therefore, voltages of the first interface and the second interface are equal, which are equal to 0. Therefore, the second switch 203 determines, through the first interface and the second interface, that the voltages of the third data transmission line 202a and the fourth data transmission line 202b are equal, so that the second switch 203 is short-circuited, and the low level signal is sent to the processor 201 through the third interface, so as to enable the telephone set to be on-hook. The low level signal is an on-hook signal.

(2) When the first switch 104 is in the disconnected state, the first data transmission line 101a and the second data transmission line 101b are disconnected, and the electrical connection between the microphone 101 and the first signal transceiver 103 is kept, and when the first interface and the second interface of the second switch 203 each detect the electrical signal received, through the signal transmission line, by the second signal transceiver 202, and determine that the voltages of the third data transmission line 202a and the fourth data transmission line 202b are not equal, the second switch keeps disconnected, and a high level signal is sent to the processor 201 through the third interface, so as to enable the telephone set to be off-hook.

When the first switch 104 is in the disconnected state, the first data transmission line 101a and the second data transmission line 101b are disconnected, so that the electrical connection state between the microphone 101 and the first signal transceiver 103 is kept. At this time, the voltages of the third data transmission line 202a and the fourth data transmission line 202b that are connected to the voice input end of the second signal transceiver 202 are not equal. The first interface is connected to the third data transmission line 202a, and the second interface is connected to the fourth data transmission line 202b; therefore, voltages of the first interface and the second interface are not equal. Therefore, the second switch 203 determines, through the first interface and the second interface, that the voltages of the third data transmission line 202a and the fourth data transmission line 202b are not equal, so that the second switch 203 keeps disconnected, and the high level signal is sent to the processor 201 through the third interface, so as to enable the telephone set to be off-hook. The high level signal is an off-hook signal.

Optionally, based on the embodiment shown in FIG. 1a, the telephone set further includes a cradle used in coordination with the handle 10, where a bulge is disposed on the cradle, and when the handle 10 is placed on the cradle, the bulge contacts the first switch 104, so that the first switch 104 is in the short-circuited state; when the handle 10 is not placed on the cradle, the first switch 104 is in the disconnected state.

In this embodiment, the cradle is used in coordination with the handle 10, and the cradle is used to place the handle 10. When the handle 10 is placed on the cradle, the bulge contacts the first switch 104, so that the first switch 104 is in the short-circuited state; when the handle 10 is not placed on the cradle, the first switch 104 is in the disconnected state.

Further optionally, based on the embodiment shown in FIG. 1a, the bulge is an on-hook press point or a magnetic control switch.

Specifically, when the handle 10 is placed on the cradle, the on-hook press point contacts the first switch 104, and because of pressure of the handle 10, the on-hook press point presses the first switch 104, so that the first switch 104 switches from the disconnected state to the short-circuited state; when the handle 10 leaves the cradle, the on-hook press point does not contact the first switch 104, and the on-hook press point no longer presses the first switch 104, so that the first switch 104 switches from the short-circuited state to the disconnected state. The on-hook press point includes but is not limited to an elastic bump.

When the bulge is the magnetic control switch, its specific working principle is similar to that of the foregoing on-hook press point, which is not elaborated herein again.

It should be noted that, the bulge only needs to satisfy physically triggering the short-circuited state and the disconnected state of the first switch 104.

In this embodiment, the cradle is a separate cradle and does not need to have any connection to the host; therefore, the cradle may be freely placed in space according to habits of different people, so as to achieve the best effect of use. For a telephone set having a wired connection, a conventional RJ9 connection line is kept between a handle and a host without the need of adding an additional connection line, which guarantees the compatibility between an external form and that of a conventional telephone set. An off-hook/on-hook signal of the handle is directly transmitted through an inherent RJ9 voice data channel of the telephone set without the need of adding an additional line connection, so that the handle can be freely and flexibly placed without being limited by the cradle.

According to the telephone set provided in this embodiment, the first switch is added on the handle of the telephone set, the second switch is correspondingly added into the host of the telephone set, and the state of the first switch is used to control the second switch to send the on-hook signal, so as to enable the telephone set to be on-hook. Compared with a conventional fixed-line phone, the use of the handle is not limited by the position of the cradle, and even the cradle is not needed. In addition, because the off-hook/on-hook detection function is implemented by the first switch in combination with the second switch, the space occupied by the fixed-line phone is decreased, and desktop layout is simplified. Furthermore, the present disclosure mainly solves the problem that a placement position of a conventional handle is limited to a cradle, and avoids problems such as interference due to crossed hands when a user performs an off-hook/on-hook operation and inconvenient use because the handle is passed between hands. In addition, because the present disclosure omits the complex circuit design of an off-hook/on-hook cradle, only a physical switch is added on the handle, and a circuit component having a voltage comparison function is added on the host, so that a principle is simple, implementation is flexible, and a design cost is low. The structure of the telephone set provided in this embodiment is universal, has a high portability, and may be applied to any handle.

Further optionally, based on the embodiment shown in FIG. 1a, the first switch 104 is a physical switch or a circuit module for implementing a switch function. In this embodiment, the state of the first switch 104 controls the electrical connection state between the microphone 101 and the first signal transceiver 103. The first switch 104 may be a physical switch, such as an isolation switch or a knife switch; the first switch 104 may further be a circuit module for implementing a switch function, such as a large resistance circuit.

In this embodiment, a passive controllable physical switch is designed on the handle to control a connection state between differential signals of the microphone, and an off-hook/on-hook signal of the handle is detected using short-circuited and disconnected states of a differential line of the microphone. Under the premise of guaranteeing that an RJ9 connection manner of a conventional handle is not changed, the off-hook/on-hook signal is transmitted to the host through an RJ9 cable.

Optionally, based on the embodiment shown in FIG. 1a, the second switch 203 is a complementary metal oxide semiconductor MOS, or a comparison circuit having a voltage comparison function.

Figure 2:
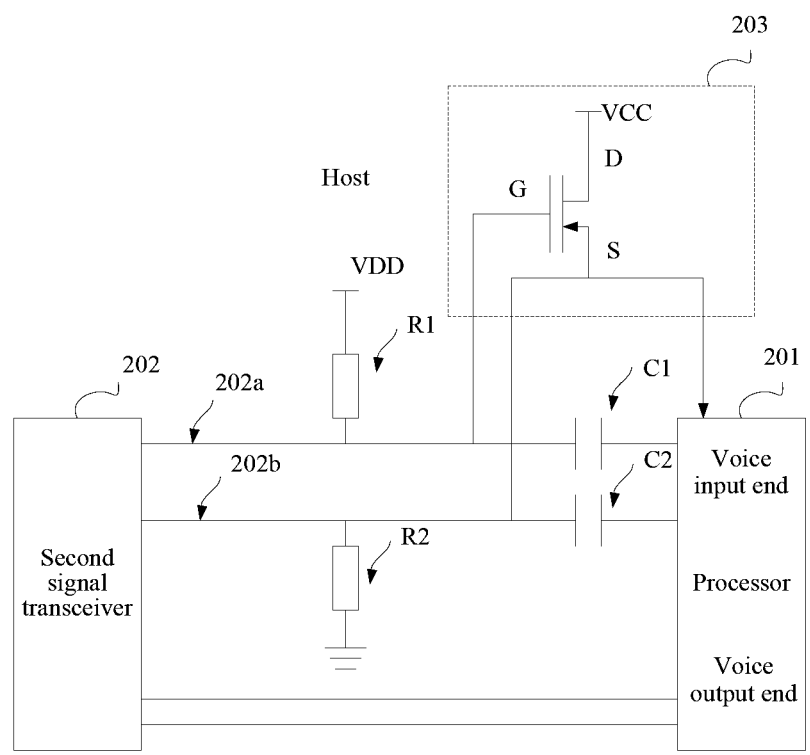
FIG. 2 is a schematic internal structural diagram of a host in a telephone set according to an embodiment of the present disclosure.

FIG. 2 is a schematic internal structural diagram of a host in a telephone set according to an embodiment of the present disclosure. In FIG. 2, that a second switch 203 is an MOS is taken as an example to illustrate an internal structure of a host. Referring to FIG. 2, a voltage of a third data transmission line 202a (a positive pole for transmitting a differential signal) is pulled up to a VDD through an R1, and a voltage of a fourth data transmission line 202b (a negative pole for transmitting a differential signal) is pulled down to the ground through an R2, which is the bias voltage design required in normal working of a microphone 101. The specific value of the VDD varies with different microphone type requirements, and the VDD may be 5V, 3.3V, or the like. The main function of capacitors C1 and C2 is to isolate a VDD bias voltage in a differential signal and transmit a real voice differential signal to a processor 201 for processing. A person skilled in the art may learn that, for the design of this part, it is the inherent receiving circuit design of a microphone in a conventional telephone, and it may slightly vary when being implemented in different telephone sets. Here, in FIG. 2, a necessary basic circuit in a conventional telephone set is only drawn.

A difference from the prior art is described as follows: In the telephone set provided in this embodiment, a second switch 203 is added between the third data transmission line 202a and the fourth data transmission line 202b. Preferably, the second switch 203 is an MOS, and the MOS includes three interfaces, where a first interface is connected to the third data transmission line 202a, a second interface is connected to the fourth data transmission line 202b, and a third interface is connected to the processor 201. For three pins of the MOS, the first interface is connected to the G of the MOS, the second interface is connected to the S of the MOS, the third interface is connected to the S of the MOS, and the D of the MOS is connected to a voltage $V_{CC}$. According to the inherent feature of the MOS, when the voltage between the G and S (the first interface and the second interface) of the MOS exceeds Vth (this value varies with different MOSs), the D and S of the MOS are in a short-circuited state. At this time, the S is directly connected to the $V_{CC}$, that is, the S of the second switch 203 sends a high level signal to the processor 201 through the third interface, and a voltage of an off-hook/on-hook signal is $V_{CC}$. When voltages of the G and S are equal, the D and S are in a disconnected state, and the S is grounded through the R2, that is, the S of the second switch 203 sends a low level signal to the processor 201 through the third interface, and a voltage of the off-hook/on-hook signal is 0V. Here, it is assumed that, for the processor 201, an input voltage is 0V, which indicates that 0 is inputted, and an input voltage is $V_{CC}$, which indicates that 1 is inputted, so that a voltage difference between positive and negative transmission lines of a differential circuit is converted through the MOS in this embodiment into digital signals 0 and 1 that can be received by the processor 201 for indicating an off-hook/on-hook state of the handle, so that the processor performs off-hook or on-hook for the telephone set according to a received input signal.

Here, the MOS is only an exemplary example, and specifically, it may be further replaced with any circuit component having large input impedance and having a voltage comparison function or a comparison circuit having a voltage comparison function, such as an operation amplifier, which is not specifically limited herein.

Furthermore, when the telephone is on-hook, differential signals of the microphone 101 are short-circuited. At this time, the microphone cannot receive a voice signal; however, because the telephone set is currently in an on-hook state, the telephone set does not process any signal transferred by the microphone, and no impact is caused to a system function here. When the telephone is off-hook, an MOS is connected in parallel on a differential channel of the microphone 101; however, because impedance between the G and S of the MOS is large and generally is 10M ohms, while impedance of the microphone 101 is small and generally is several K ohms, the parallel connection between impedance of the D and S and impedance of the microphone does not affect the microphone 101. In addition, an amplitude of a differential signal of a voice normally transmitted by the microphone generally is small (where the maximum does not exceed 50 mV, which is far smaller than $V_{DD}$); therefore, voltage fluctuation of the differential signal does not affect an overall voltage difference between the G and S of the MOS, thereby guaranteeing that an off-hook/on-hook signal output at the S of the MOS is stabilized at $V_{CC}$ when off-hook.

Figure 3:
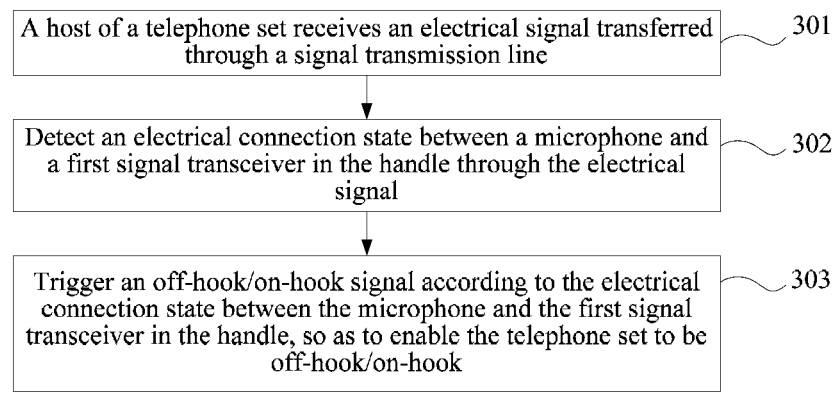
FIG. 3 is a flowchart of a method of controlling off-hook/on-hook state of a telephone set according to an embodiment of the present disclosure.

FIG. 3 is a flowchart of a method of controlling off-hook/on-hook state of a telephone set according to an embodiment of the present disclosure. The telephone set includes a handle and a host, where the handle is connected to the host through a signal transmission line. Referring to FIG. 3, this embodiment includes:

301: The host of the telephone set receives an electrical signal transferred through the signal transmission line.

302: Detect an electrical connection state between a microphone and a first signal transceiver in the handle through the electrical signal.

303: Trigger an off-hook/on-hook signal according to the electrical connection state between the microphone and the first signal transceiver in the handle, so as to enable the telephone set to be off-hook/on-hook.

Optionally, the foregoing step 303 "triggering an off-hook/on-hook signal according to the electrical connection state between the microphone and the first signal transceiver in the handle, so as to enable the telephone set to be off-hook/on-hook" includes: when it is detected that the electrical connection state between the microphone and the first signal transceiver is disconnected, sending a low level signal to a processor in the host, so as to enable the telephone set to be on-hook; when it is detected that the electrical connection state between the microphone and the first signal transceiver is that the an electrical connection is kept, sending a high level signal to a processor in the host, so as to enable the telephone set to be off-hook.

Specifically, the telephone set shown in FIG. 1b is taken as an example. When the first switch 104 is in a short-circuited state, the first data transmission line 101a and the second data transmission line 101b are short-circuited, so that the electrical connection state between the microphone 101 and the first signal transceiver 103 is disconnected. At this time, voltages of the third data transmission line 202a and the fourth data transmission line 202b that are connected to the voice input end of the second signal transceiver 202 are 0, that is, the voltages of the third data transmission line 202a and the fourth data transmission line 202b are equal. The first interface is connected to the third data transmission line 202a, and the second interface is connected to the fourth data transmission line 202b; therefore, voltages of the first interface and the second interface are equal, which are equal to 0. Therefore, the second switch 203 determines, through the first interface and the second interface, that the voltages of the third data transmission line 202a and the fourth data transmission line 202b are equal, so that the second switch 203 is short-circuited, and a low level signal is sent to the processor 201 through the third interface, so as to enable the telephone set to be on-hook. The low level signal is an on-hook signal. When the first switch 104 is in a disconnected state, the first data transmission line 101a and the second data transmission line 101b are disconnected, so that an electrical connection state between the microphone 101 and the first signal transceiver 103 is kept. At this time, voltages of the third data transmission line 202a and the fourth data transmission line 202b that are connected to the voice input end of the second signal transceiver 202 are not equal. The first interface is connected to the third data transmission line 202a, and the second interface is connected to the fourth data transmission line 202b; therefore, voltages of the first interface and the second interface are not equal. Therefore, the second switch 203 determines, through the first interface and the second interface, that the voltages of the third data transmission line 202a and the fourth data transmission line 202b are not equal, so that the second switch 203 keeps disconnected, and a high level signal is sent to the processor 201 through the third interface, so as to enable the telephone set to be off-hook. The high level signal is an off-hook signal.

It should be noted that, the method provided in this embodiment is applied to the telephone sets in the embodiments shown in FIG. 1a, FIG. 1b, and FIG. 2, and for the specific implementation process, reference is made to specific description in the embodiments corresponding to FIG. 1a, FIG. 1b, and FIG. 2, which is not elaborated herein again.

A person of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The foregoing description is merely about exemplary embodiments of the present disclosure, but is not intended to limit the present disclosure. Any modification, equivalent replacement, or improvement made within the idea and principle of the present disclosure shall fall within the protection scope of the present disclosure.

What is claimed is:

1. A telephone set, comprising a handle and a host, wherein the handle is connected to the host through a signal transmission line, the handle comprising a microphone, a telephone receiver, and a first signal transceiver, wherein the telephone receiver is electrically connected to the first signal transceiver, and the microphone is electrically connected to the first signal transceiver, and the host comprises a processor and a second signal transceiver, and the processor is electrically connected to the second signal transceiver, wherein;

the handle further comprises a first switch, and a connection state of the first switch controls an electrical connection state between the microphone and the first signal transceiver; and the host further comprises a second switch, wherein the second switch learns the electrical connection state between the microphone and the first signal transceiver by detecting an electrical signal received, through the signal transmission line, by the second signal transceiver, and sends an off-hook/on-hook signal to the processor according to the electrical connection state between the microphone and the first signal transceiver, so as to enable the telephone set to be off-hook/on-hook wherein a voice input end of the processor is electrically connected to a voice input end of the second signal transceiver through a third data transmission line and a fourth data transmission line, wherein the third data transmission line and the fourth data transmission line are a positive transmission line and a negative transmission line of a differential circuit in the second signal transceiver, respectively, and the second switch comprises three interfaces, wherein a first interface is connected to the third data transmission line, a second interface is connected to the fourth data transmission line, and a third interface is connected to the processor; and correspondingly, that the second switch learns the electrical connection state between the microphone and the first signal transceiver by detecting an electrical signal received, through the signal transmission line, by the second signal transceiver, and sending an off-hook/on-hook signal to the processor according to the electrical connection state between the microphone and the first signal transceiver, so as to enable the telephone set to be off-hook/on-hook comprises:

when the first switch is in a short-circuited state, the first data transmission line and the second data transmission line are short-circuited, and the electrical connection state between the microphone and the first signal transceiver is disconnected, and when the first interface and the second interface of the second switch each detect the electrical signal received, through the signal transmission line, by the second signal transceiver, and determine that voltages of the third data transmission line and the fourth data transmission line are equal, the second switch is short-circuited, and a low level signal is sent to the processor through the third interface, so as to enable the telephone set to be on-hook;

when the first switch is in a disconnected state, the first data transmission line and the second data transmission line are disconnected, and an electrical connection between the microphone and the first signal transceiver is maintained, and when the first interface and the second interface of the second switch each detect the electrical signal received, through the signal transmission line, by the second signal transceiver, and determine that voltages of the third data transmission line and the fourth data transmission line are not equal, the second switch is disconnected, and a high level signal is sent to the processor through the third interface, so as to enable the telephone set to be off-hook.

2. The telephone set according to claim 1, wherein the microphone is electrically connected to the first signal transceiver through a first data transmission line and a second data transmission line, wherein the first data transmission line and the second data transmission line are a positive transmission line and a negative transmission line of a differential circuit in the microphone, respectively, and two interfaces of the first switch are connected to the first data transmission line and the second data transmission line, respectively; and correspondingly, that a connection state of the first switch controls an electrical connection state between the microphone and the first signal transceiver comprises: when the first switch is in a short-circuited state, the first data transmission line and the second data transmission line are short-circuited, and the electrical connection state between the microphone and the first signal transceiver is disconnected; when the first switch is in a disconnected state, the first data transmission line and the second data transmission line are not short-circuited, and an electrical connection between the microphone and the first signal transceiver is maintained.

3. The telephone set according to claim 1 further comprising a cradle used in coordination with the handle, wherein a bulge is disposed on the cradle, and when the handle is placed on the cradle, the bulge contacts the first switch, so that the first switch is in a short-circuited state; and wherein when the handle is not placed on the cradle, the first switch is in a disconnected state.

4. The telephone set according to claim 3, wherein the bulge is an on-hook press point or a magnetic control switch.

5. The telephone set according to claim 3, wherein the first switch is a physical switch or a circuit module for implementing a switch function, and the second switch is a metal oxide semiconductor (MOS) switch, a comparison circuit having a voltage comparison function, or a circuit component having a voltage comparison function.

* * * * *